Jan. 13, 1970

J. P. VAN DIEVOET ET AL  3,489,646

METHOD OF PULSATING OR MODULATING A NUCLEAR REACTOR

Filed April 22, 1964

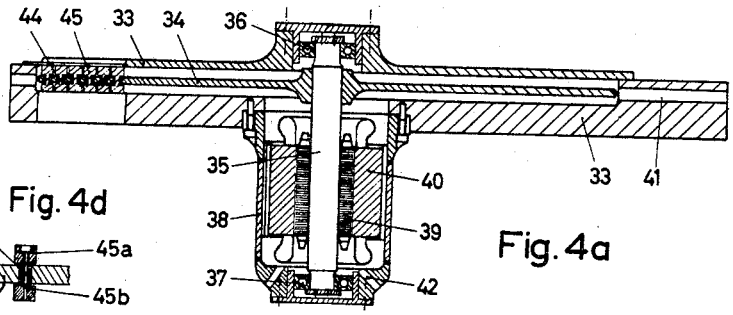
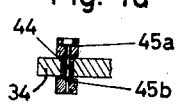
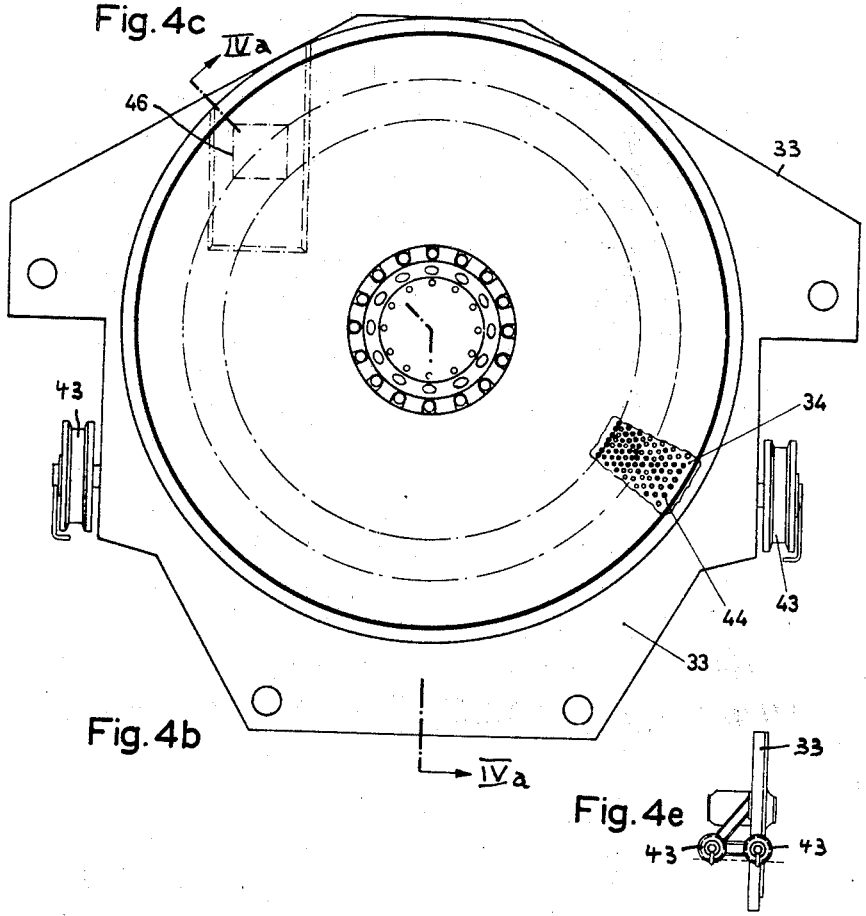

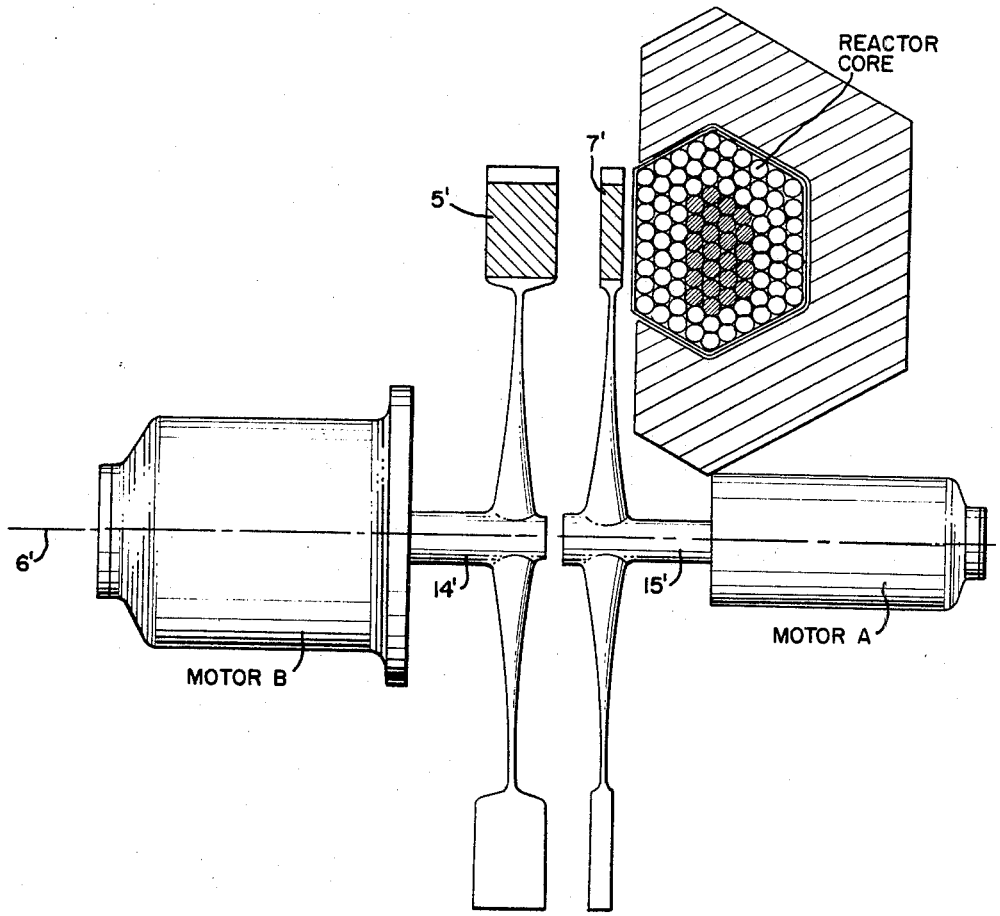

United States Patent Office 3,489,646
Patented Jan. 13, 1970

3,489,646
METHOD OF PULSATING OR MODULATING A NUCLEAR REACTOR
Jean Paul Van Dievoet, Ixelles, Emile Fossoul, Crainhem, Michel Stiévenart, Etterbeek, and Guy Tavernier, Wezembeek-Ophem, Belgium, and Gerold Herzog, Günter Hildenbrand, Horst Michael, and Ernst Schwarz, Erlangen, Germany, assignors to Siemens Aktiengesellschaft, Erlangen, Germany
Filed Apr. 22, 1964, Ser. No. 361,907
Claims priority, application Germany, Apr. 24, 1963,
S 84,848
Int. Cl. G21c 19/02, 7/08, 7/10
U.S. Cl. 176—28          8 Claims Our invention relates to a method of pulsating or modulating the operation of a nuclear reactor.

A pulsating reactor operation for the purpose of generating neutron pulses can be produced by causing the reactor for short intervals of time to generate a very high power output beyond its continuous power rating. Other purposes pose the problem of simply modulating the reactor by periodically varying the neutron flux density. In the present disclosure, the term "modulating" is also applied in its broader sense, so as to denote a pulsating as well as any other periodically varying operation distinct from the normal, constant or an abnormally erratic performance.

The following three fundamentally different methods of producing neutron pulses have been proposed:

(1) A control element, for example an absorber rod, is rapidly moved out of the core so that the reactor turns highly supercritical. The resulting energy excursion of the reactor then is compensated by the inherent negative temperature coefficient of the reactivity, and the reactor is thereafter returned to subcritical operation by means of a control element, for example by reinserting the absorber rod previously run out of the core. Only when the reactor core has thereafter cooled sufficiently, can a new energy pulse be generated in this manner. The minimum time spacing between successive pulses, therefore, is rather long and the pulse frequency correspondingly low. Furthermore, the shape of the energy pulse can be influenced to a slght degree only.

(2) A periodically operating mechanism moves a portion of the reactor core toward and away from the remaining core portion so that the reactor is alternately controlled to operate supercritically and subcritically. This produces corresponding energy pulses. Since the travelling direction of the moving reactor-core portion must be reversed, only low pulse frequencies can be attained. The resulting pulses have a small amplitude and a rather large width of their half-values.

(3) The reactor core has a gap extending from the edge to the core center, and a rotor, rotating at high speed about an axis outside of the reactor core, moves through the gap and carries on its periphery a piece of fissionable material which thus is periodically moved through the center of the reactor core. In this manner, high and narrow energy pulses of high frequency can be obtained, and the pulse shape depends essentially upon the speed of the reactivity change as the fissionable specimen passes through the reactor core. For obtaining narrow pulses of high repetition frequency, correspondingly high specimen speeds and high rotational speeds of the rotor are required. The half-wave width of the pulses is fixed by the specimen speed, and the pulse frequency is determined by the frequency of rotor rotation. For a given rotor, a lower frequency of rotation would increase the half-wave width of the pulses because of the reduction in specimen speed. To prevent this, and for also obtaining a small half-wave width at lower pulse frequencies, a second specimen of fissionable material is mounted on a second rotor and is periodically moved close to the edge of the gap zone. The reactivity pulses required for producing the desired energy pulses come about by the conjoint effects of the two specimen pieces. The second rotor is synchronized with the first rotor and adjustable to different fixed values whose respective ratios to the constant speed of the first rotor are integers. The fissionable specimen piece of the first rotor continues to substantially determine the shape of the energy pulses. Since appreciable pulses are generated only when both fuel specimens are simultaneously in the respective ranges of maximal efficacy, a discrete sequence of pulse frequencies while preserving the pulse characteristic can be produced by incrementally reducing the speed of the second rotor. The ratio of the energy contained in the pulse to the total energy of a cycle period (comprising the pulse duration as well as the appertaining dead pulse interval), which constitutes an essential characteristic of the pulse method, remains constant for such a discrete sequence of pulse frequencies.

It is an essential advantage of the last-mentioned method over the two other methods that it affords a pulse operation that can be selectively adjusted or pre-set within certain limits in accordance with the desired purpose, particularly with respect to the half-wave width and frequency of the pulses. Disadvantages of the last-mentioned method are the requirement that for producing the required excessive reactivity, the first rotor and its amount of fissionable material must pass through a gap which intersects the reactor core, and that the amounts of fuel material on the two rotors, particularly on the first rotor, become very strongly activated and heated at relatively high power outputs of the reactor. This also imposes a severe limitation upon the median reactor power output attainable. The extensive subdivision of the reactor core aggravates providing for liquid cooling at high power outputs, unless the usually desired compact design of the reactor core is sacrificed and an increase in nuclear fuel quantity and impairment in pulse characteristic is put up with. The extremely strong activation of the rotating fuel bodies occurring at high power output, requires comprehensive shielding to permit maintenance work at the rotors. Furthermore, the intensive heat generation in the rotating fuel bodies occurring at high power output would require providing them with separate cooling devices. The only known pulsating reactor operating in accordance with the third-mentioned method, has a median power output of no more than 1 kw. in pulsating operation.

A modulation of the neutron flux density has not been performed with any of the reactors that so far have become known to operate in accordance with any of the three mentioned methods. Such modulation is predicated upon the requirement that the reactivity of the reactor can be periodically varied with the aid of suitable devices, for example, periodically moving absorbers.

It is an object of our invention to devise a method of subjecting a nuclear reactor to pulsating or other modulated operation without incurring the disadvantages of the known methods.

One of the more specific objects of the invention is to afford a pulsating or other modulated reactor operation without the necessity of splitting the reactor core down to its center or to any comparable extent, thus minimizing the difficulties and reducing the limitations heretofore encountered with the above-mentioned third method.

Still another object of the invention is to afford a pulsating or otherwise modulated reactor operation without necessitating a departure from a compact reactor-core design or requiring an appreciable increase in nuclear fuel consumption.

It is also an object of the invention to afford a pulsating or otherwise modulated reactor operation that permits a better control and modification of the pulse or modulating characteristic than heretofore obtainable.

According to our invention, we control the operation of a nuclear reactor by moving one or more structures containing at least at certain localities, an amount of neutron-active substance, at a place outside the nuclear fission region of the reactor, and we thereby modify, in dependence upon the speed of the structure, a neutron flow issuing from the reactor core.

The specimens of neutron-active material which thus modify the reactivity of the reactor system from the outside may be neutron-generating and/or neutron-influencing material, such as fissionable material, reflector material or other neutron-influencing substance. When using fission material (fuel), the disadvantages discussed above with reference to the third-mentioned method are in part eliminated and in part greatly reduced. When using other specimen materials, these disadvantages are entirely eliminated.

We have discovered and have confirmed by comprehensive analysis of the essential conditions of pulsating operation, that the ratio of the energy contained in a pulse to the energy obtaining during a cycle period, expressed as a function of the influence imposed by the active specimens upon the reactivity, rapidly approaches saturation as the reactivity increases, and that therefore a good pulse characteristic can also be achieved if both specimens of neutron-active material act only from the outside upon the reactor core.

According to another feature of our invention, the core of a fast reactor is so designed, for example by composing it of nuclear fuel rods of respectively different lengths, that an approximately spherical core shape is formed by fuel-rod groups arranged hexagonally and coaxially within one another, the length of the rods near the periphery being lower than that of the inner rods. However, on one side of such a roughly spherical core we provide a "window" by making the rods at this side longer than corresponds to the other rods in the same group. A strong neutron flow passes through this window to the outside of the core; and we place the movable bodies of fissionable or other neutron-active material into this neutron flow externally of the core, thus making the movement of the changes effective for pulsating or modulating the reactor. In this manner, an extremely compact core configuration is achieved which, by virtue of the intensive neutron flow issuing through the window, affords a particularly good efficacy of the rotating neutron-active charges.

The above-mentioned and further objects, advantages and features of our invention, said features being set forth with particularity in the claims annexed hereto, will be apparent from and will be mentioned in, the following with reference to embodiments of nuclear reactor devices designed and operative in accordance with the invention, illustrated by way of example on the accompanying drawings, in which:

FIG. 3b is a lateral elevation corresponding to FIG. 3a.

FIG. 4a shows in cross section a modulating device for rotating neutron-active material in front of a reactor according to the one shown in FIGS. 1 and 2.

FIG. 4b is a lateral elevation corresponding to FIG. 4a.

FIG. 4c presents a sectional view and FIG. 4d a plan view of a detail embodied in FIGS. 4a and 4b; and FIG. 4e shows the device of FIGS. 4a and 4b seen from the left of FIG. 4b.

Figure 5:
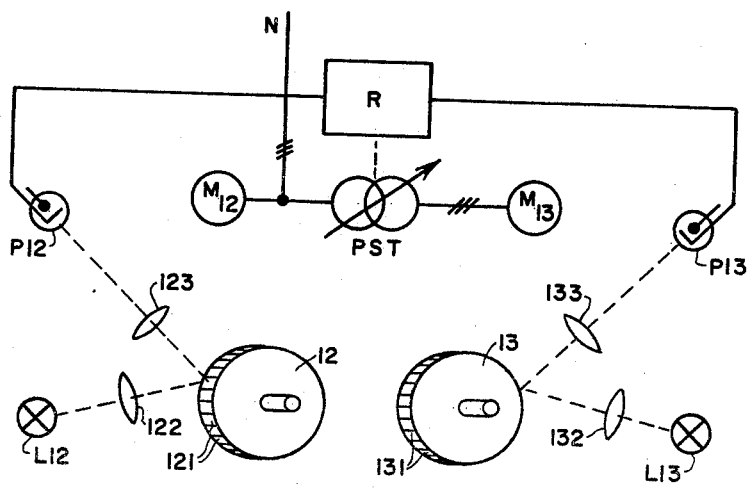

FIG. 5 is a schematic diagram relating to the operation of a reactor modulating device.

FIG. 6 is a schematic view of another embodiment of the invention.

Figure 1:
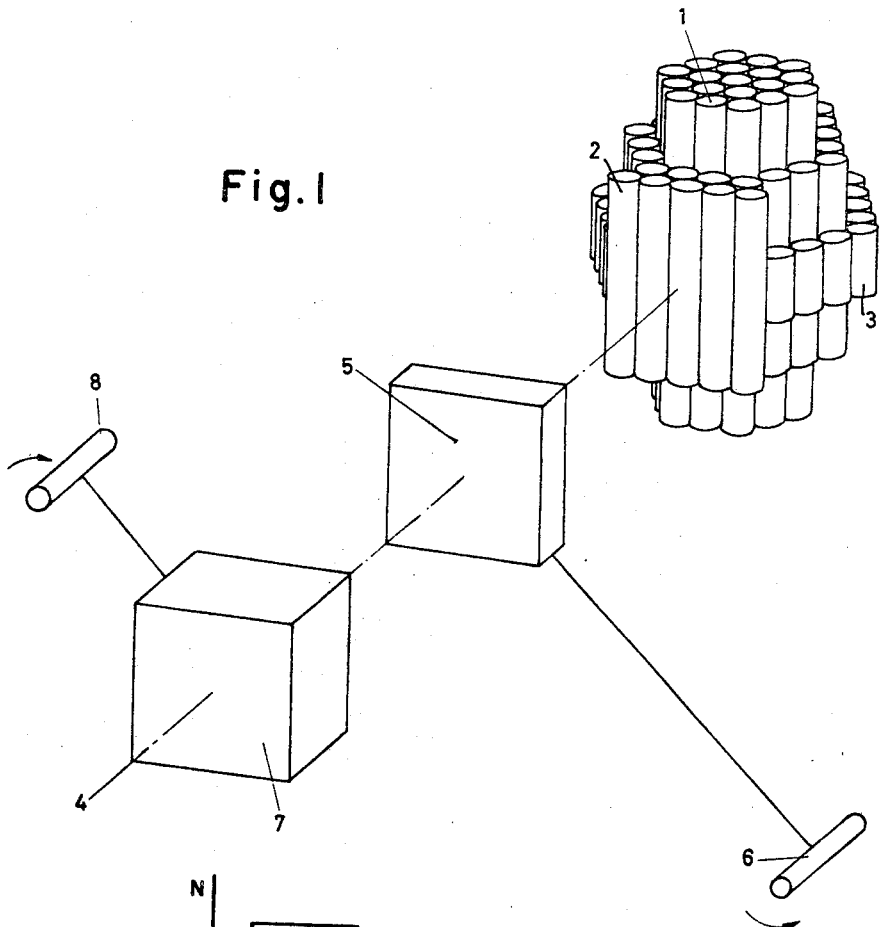
FIG. 1 is a schematic diagram relating to the method and a reactor device according to the invention.

In FIG. 1, the fuel rods of respectively different lengths, of which the reactor core is composed, are denoted by 1, 2 and 3. The fuel rods consist of highly enriched fissionable material such as exemplified hereinafter. The rods 1 in the interior region of the core are longer than the rods in the next group surrounding the group of rods 1. The rods 3 in the outermost group have the shortest length so that the core arrangement as a whole constitutes a quasi-spherical arrangement. More accurately, the horizontal cross section through the center of the core has substantially hexagonal shape, as is best apparent from FIG. 2. On one side of the hexagonal cross section the short rods 3 of the outermost group are replaced by a number of longer rods 2 (FIG. 1) which constitute a neutron-flux window. During operation of the reactor, a flow of neutrons issues through the window along the axis denoted by 4 in FIG. 1. Located in front of the neutron flux window are two neutron-active bodies 5 and 7 consisting of nuclear fuel or reflector material. They are fastened by respective arms to shafts whose respective axes 6, 8 (FIGS. 1, 2) are parallel to the axis 4 of the neutron-flux window.

Figure 2:
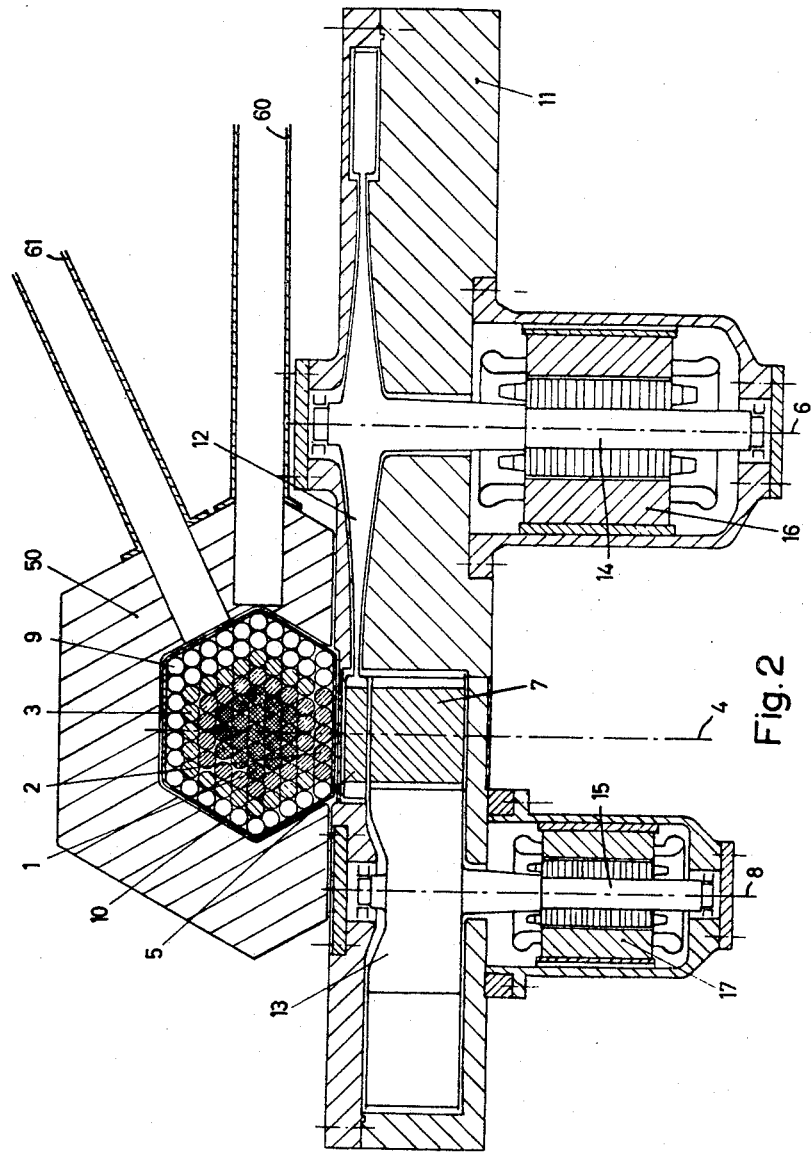
FIG. 2 shows in section a nuclear reactor device corresponding to that of FIG. 1.

For the purpose of illustration, the two neutron-active specimens 5 and 7 are shown in FIG. 1 axially away from their actual position which is as close to the window as the reactor design will permit, this being apparent from FIG. 2.

Appreciable pulses are produced only when both specimen bodies 5 and 7 pass simultaneously through the window axis 4. The body 5 rotates at constant speed and determines the wave shape of the pulses produced. The rotating speed of the body 7 is synchronized with that of body 5 so that the speed ratio is an integral number. The rotating body 7 thus constitutes a frequency selector which determines a discrete series of available pulse frequencies.

While reference is made particularly to fast reactors, the described design of the reactor core with a window for issuing a strong neutron flux in a given direction is analogously applicable with thermal (slow) reactors.

As shown in FIG. 2, the reactor core proper, formed by rods 1, 2 and 3, is enclosed by a group of rod-shaped reflector elements 9 which leave the window, formed by the rods 2, exposed so that the above-mentioned neutron flow can issue in the direction of the window axis 4. The reactor core is accommodated in a tank 10 and traversed by a cooling liquid which, in the described example of a fast reactor, preferably consists of a sodium-potassium mixture. With the exception of the window side, the tank 10 is surrounded by an external reflector or shield 50. The external reflector is traversed at suitable localities by radiation tubes 60 and 61 from which the neutron radiation for measuring and testing purposes can be taken.

Located on the side of the reactor window is the device for pulsing the reactor performance. It comprises a housing 11 in which two rotating discs 12 and 13 are located. The axes 6 and 8 extend parallel to the window axis 4. The corresponding shafts 14 and 15 of respective discs 12 and 13 are driven by electric motors 16, 17 and run in ball bearings. Each disc 12, 13 carries at one locality of its periphery a reflector piece 5 or 7 of non-fissionable material to act as neutron-active specimens. The reflector piece 5, contributing the greater share of reactivity, essentially controls the wave shape of the pulses. The reflector piece 7 constitutes the frequency selector.

Figure 3A:
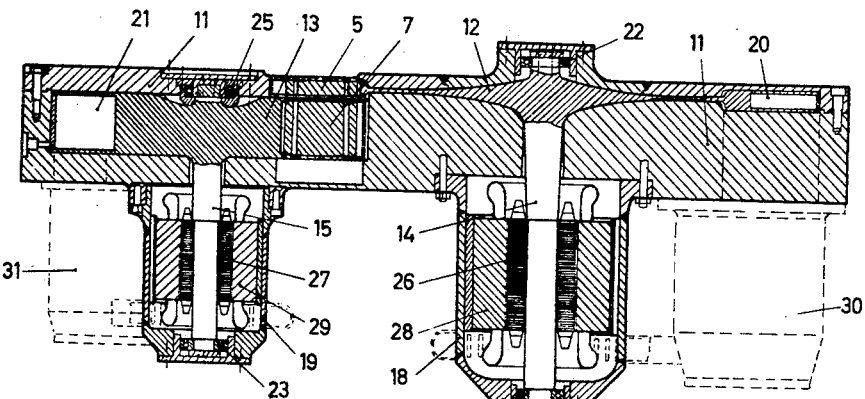
FIG. 3a is a sectional view of a device for rotating two bodies of neutron-active material and corresponds essentially to a portion of FIG. 2, the section being taken along the line IIIa—IIIa in FIG. 3b.
Figure 3C:
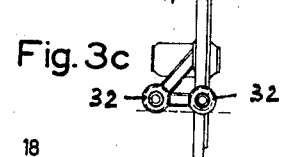
FIG. 3c shows the device of FIGS. 3a and 3b seen from the left of FIG. 3b.
Figure 3B:
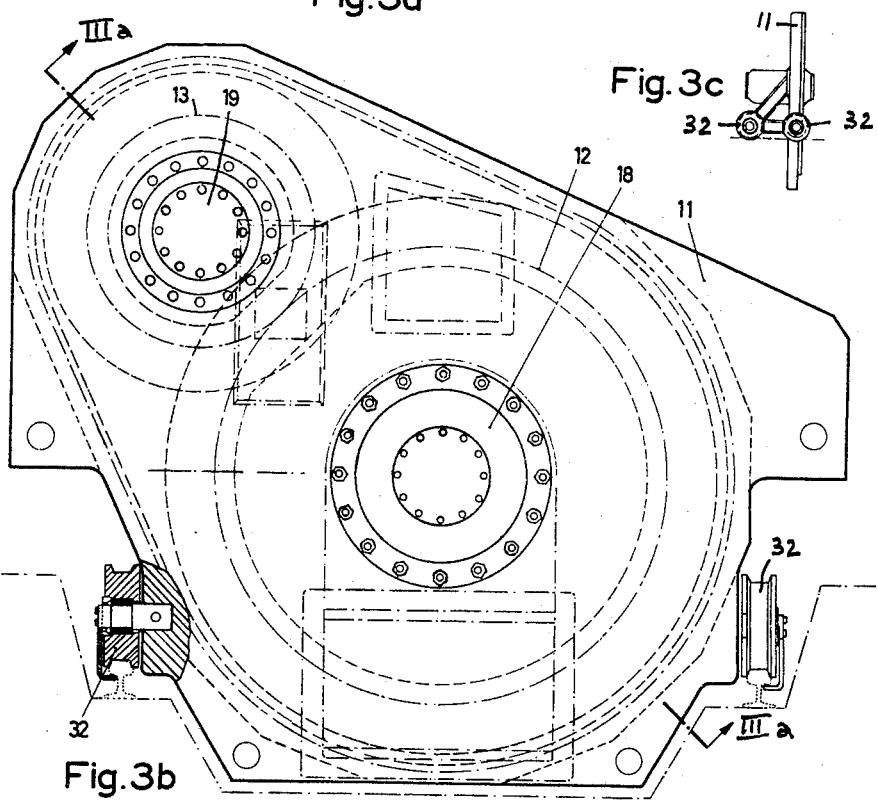

FIGS. 3a and 3b show the design of the pulsing device more in detail. The two electric motors for driving the respective shafts 14 and 15 of the discs 12 and 13 have their housings 18 and 19 fastened to the housing 11 of the entire device. The material of the housing 11, relating to the example of a pulsating fast reactor, may consist of steel or aluminum alloys, and the discs 12 and 13 can be made of steel, titanium, magnesium, aluminum and their alloys, for example. The two neutron-active bodies 5 and 7, if made of reflector material, consist for example of beryllium, molybdenum, nickel or steel. Beryllium offers the particular advantage of combining a particularly large reflector-action with slight density, thus facilitating the balancing of the rotating discs. In thermal reactors, the material for the two reflector pieces may consist of beryllium or graphite, for example.

The neutron-active specimen pieces 5 and 7 may also consist of fissionable material such as of the same material as the fuel rods mentioned presently.

The fuel rods of the reactor core consist, for example, of enriched fissionable uranium (90%) or also of plutonium. When employing highly enriched uranium, the rod-shaped fuel elements may be given a diameter of about 20 mm. for an approximately 2 liter volume of the pseudo-spherical core arrangement of rods 1, 2 and 3. This corresponds to an equivalent core diameter of approximately 16 cm. The inner reflector formed of the rod elements 9 has a content of approximately 5 liter. Its height is approximately 27 cm. and its outer diameter about 34 cm. Natural uranium may be used for the reflector rods 9. When employing beryllium as specimen bodies, the body 5, relating to the above-exemplified core dimensions, may be given a length and width of 10 cm. each and a thickness of 3.5 cm. The specimen body 7, also consisting of beryllium, may be given a length and width of 10 cm. each, and a thickness of 11.5 cm. It will be understood that all of the numerical values given herein are presented as examples only, and can be modified to suit any particular purpose or power requirements.

Instead of mounting the two neutron-active bodies 5 and 7 on rotating discs, they may be moved on their respective circular paths by other suitable devices, for example such rotating arms as are schematically apparent from FIG. 1, depending upon technical requirements and desiderata of each particular application. In the above-described example, the main disc 12 is designed as a disc of uniformly distributed strength and is operated at a constant rotating speed of 6000 r.p.m. The reflector piece 5 has a median distance of 44 cm. from its rotational axis 6 and rotates at a peripheral speed of 275 m. per second. The frequency-selector disc 13, designed with uniform thickness, can be selectively operated at regulated speeds of 750, 1500, 3000 and 6000 r.p.m. To facilitate balancing the rotating discs 12 and 13, particularly for operation at high speeds, they are provided with respective recesses 20 and 21 at localities diametrically opposite the reflector pieces 5 and 7. Into each recess there can be inserted a corresponding piece of material whose mass is equal to that of the reflector piece but whose effect upon reactivity corresponds to that of the disc material.

Each of the two shafts 14 and 15 is journalled in a fixed bearing 22 or 23 and a loose bearing 24 or 25. The fixed bearing 22 of the main disc is located on the reactor side. The fixed bearing 23 of the frequency selector disc is located on the motor side. Suitable as bearings are glide bearings with circulating oil lubrication, ball bearings with circulating oil lubrication or oil-mist lubrication, ball bearings with grease lubrication or gas bearings, for example. Since the lubricants are destroyed in time by radiation, it is advisable when using oil lubrication to conduct the oil circulation in such a manner that the oil can be continuously replenished in regions outside the radiation zone; or when using grease lubrication, the bearings with the grease chambers should be designed as units which can be removed and replaced by new units from time to time. Gas bearings offer the advantage that radiation damage is prevented, but they are applicable, as a rule, only at suitably high speeds of rotation.

The rotors 26 and 27 of the two electric motors are preferably fastened on the respective shafts 14 and 15 by shrinking, and the lamination stacks of the respective stators 28 and 29 are press-fitted into the motor housings 18 and 19 respectively. Particularly suitable with respect to constant rotating speed, electric regulation of the speed and phase position as well as good radiation stability of the structural components, are the so-called reluctance motors (synchronous motors without separate excitation). Their rotors are fully radiation-resistant. The insulating material of the stator stacks preferably consists of a highly radiation-resistant substance, such as polyurethane with glass fiber reinforcement. Upon prolonged periods of operation, the stator stacks together with their housings can be exchanged, preferably simultaneously with the above-mentioned exchange of the bearings.

For minimizing the power required for driving the two discs 12 and 13, the discs can be rotated in vacuum. However, when very high speeds are required, as is the case in the above-described example, it is preferable to fill the housing 11 with gas, such as helium, for cooling the motors and bearings. The two rotating discs 12 and 13 then produce a fan action to keep the coolant gas in motion. For this purpose, a locality of the housing 11 remote from the shaft can be connected by a circulating tube system with localities of motor housings 18 and 19 that are close to the shaft, thus providing for forced circulation of the coolant gas. The tube system passes through one or more coolant-air heat exchangers 30 and 31 (FIG. 3a) mounted on the housing 11 which dissipate the heat from the coolant gas to the environment of the pulsing device.

The pulsing device is provided with four running wheels 32 (FIGS. 3b, 3d) with whose aid it can be run on rails into operating position directly in front of the reactor window.

The synchronization of the two discs 12 and 13 can be effected in any conventional manner, for example by means of a voltage-supply and regulating set which comprises a speed-controlled motor, two generators and a gear switching mechanism (not shown). The set furnishes the alternating voltages for the two reluctant motors of the pulsing device and regulates the phase position of the two discs. A requirement for such regulation is the provision of sufficiently sharp signals which indicate the passage of the two neutron-active bodies 5 and 7 through the axis 4 of the reactor window. Applicable as signals are light pulses produced by providing the peripheries of the two discs 12 and 13 with narrow mirror strips 121, 131 (FIG. 5) as are obtainable simply by polishing the respective areas on the periphery. The mirror strips may operate on the autocollimation principle, together with a lens 123 or 133, to throw the image of a light source upon the light-sensitive surface of a photo-multiplier at each moment when an individual mirror passes through its reflection position. A light source L12 or L13, an image-producing lens 122 or 132 and a photo-multiplier P12 or P13 are thus provided for each of the two discs 12 and 13. The voltage pulses of the two photo-multipliers are supplied to a regulator R which acts through a phase-rotating transformer PST and the drive motor M13 of the frequency-selector disc 13 to vary the phase position of this disc until the phase-angle difference between the two reflector bodies 5 and 7 at their passage through the window axis 4 becomes smaller than a given limit value of, for example, 0.5°. Since the light sources, lenses and photo-multipliers are arranged outside of the pulsing device, the housing 11 is equipped with two glass windows at suitable localities which permit the light for the optical signals to pass onto and back from the mirrors polished onto the peripheries of the two discs 12 and 13. It will be understood that the synchronizing means are not part of the invention proper and that any other synchronizing devices may be used, a variety of such devices being known and available for such purposes as the synchronization of electrical machines, telegraphs and computer equipment, for example.

The above-described example, according to which the two neutron-active bodies act upon the same reactor window, affords the advantage that the other sides of the reactor core remain available for the provision or insertion of other reactor components, for example control rods and tubes for coolant circulation, or for the insertion or attachment of experimenting and testing devices such as radiation tubes, thermal columns, radiation chambers, and the like. This is exemplified by the provision of the radiation outlet tubes 60 and 61 shown in FIG. 2.

As shown in FIG. 3b, the neutron-active bodies may rotate about respective axes located on a diagonal of the rectangular or square reactor window. If desired, however, the axes of rotation may be located on one and the other diagonal respectively of the reactor window. The rotational axes of the two neutron-active bodies may also be arranged in any other desired orientation relative to the reactor window. Thus, the two neutron-active bodies 5', 7' may be attached to shafts 14', 15' that revolve in coaxial relation to each so that the two bodies rotate about one and the same axis 6', as shown in FIG. 6.

In the above-described example, the two neutron-active bodies provide each a certain share of the total layer thickness of fissionable or reflector material required for the total reactivity effect, the distribution of these two shares being in accordance with the two respective functions performed by the two neutral-active bodies, namely shaping the pulse wave on the one hand, and varying the pulse frequency on the other hand, taking into account the "shading" of the second body by the first body. In special cases, however, the relative share of reactivity provided by each of the two active bodies can also be based upon having them act upon window areas of respectively different sizes in accordance with the different effectiveness required for the two functions to be performed by the respective bodies.

In cases where the immediate vicinity of the reactor core is not needed to a great extent for accommodating inserts or experimenting devices, the reactor core may be provided with two neutron flux windows on different sides of the core, and the two neutron-active specimen bodies are then located in front of the respective windows. In such a device, the second neutron-active body need not act through the first body but performs a direct action in the same manner as the first body.

It is preferable to select the shape and dimensions of the reactor window or windows, as well as the shape and dimensions of the neutron-active bodies, in proper relation to each other, because these geometrical factors have an influence upon the shape of the reactivity pulses produced by the rotating bodies and upon the resulting power pulse. In the above-described example the reactor window and the two reflector pieces are of square shape and of the same size, and the two rotational axes are located on one and the same diagonal of the reactor window. Furthermore, the two discs rotate in mutually opposed directions, and the square bodies 5 and 7 are arranged on the discs in such an orientation that one of their corners points in the direction toward the other window diagonal as the body enters into overlapping relation to the reactor window. Under these conditions a particularly steep ascending front of the reactivity pulse is achieved in the region where the reactivity influence has a maximum; that is, a particularly large rate of change in reactivity is obtained, this results in a very narrow power pulse of the reactor. In other cases, other viewpoints may be preferable and may result in selecting a different manner of having the neutron-active bodies enter into the window-overlapping region. For example, instead of entering into the overlapping region on a diagonal, they may enter from a lateral side of the square window. Analogously, a different shape of the reactor window and of the specimen bodies may be chosen, for example if, instead of a very narrow and symmetrical power pulse, an asymmetrical pulse and a special shape of the ascending or descending wave flank is required.

Aside from producing a pulsating reactor operation, the present invention also affords any other periodic variation with respect to neutron flux density and power output of a reactor i.e. generally any other modulation of the reactor. Applicable for any such purposes are devices essentially as described above, acting exclusively from the outside of the reactor core. By suitable design of these devices and their active components, the function according to which the neutron flux density and power output are to be varied periodically, as well as the amplitudes and frequencies of the periodic flux density and power variations can be adapted to the particular experimental requirements desired.

According to an embodiment of the invention preferred for modulating purposes, the above-described rotating discs of the pulsating device are substituted by a single rotating disc located in front of the neutron flux window of the reactor core. The annular zone of this disc which during disc rotation about an axis parallel to that of the reactor window, passes by the window, is occupied with fissionable or reflecting material in such a manner that the reactivity influence of the annular zone upon the reactor core varies during disc rotation in accordance with a predetermined function. The frequency of the modulation thus produced with respect to neutron flux density and reactor power output can be adjusted by varying the rotation frequency of the disc. Since such modulation, as a rule, requires a lesser reactivity influence than a substantially full pulsing of the particular reactor, it is generally sufficient to exclusively employ reflector material rather than fissionable material in the range of the effective annular zone of the rotating disc.

The required periodic arrangement of the neutron-active material in the annular zone of the rotating disc can be effected, for example, by varing the shape and size of the active ranges peripherally along the annular zone. The latter type of arrangement has the advantage of permitting greater reactivity differences and consequently larger amplitudes of the periodic variations in neutron flux and power output. This is because in the latter case the regional influence determined by the extent of the reactor window is larger than when the variation in arrangement of the material is effected by alternating changes of its thickness.

According to a more specific feature of the invention relating to devices of the last-mentioned type, the rotating disc is provided with bores in the range of its active annular zone, and the neutron-active material is constituted by pins which are selectively inserted into these bores. This type of device permits a very accurate adjustment with respect to the amplitude and wave shape of the modulation merely by selecting the bores into which the pins are plugged or by changing the setting of the pins. In this manner a great variety with respect to shape and size of the active regions within the annular zone of the rotating disc can be provided. The best suitable shape of the active region, as a function of the desired reactor modulation, can be determined either by calculation or experimentally with respect to the type of modulating function, amplitude and frequency.

The above-mentioned features of the modulating device are embodied in the apparatus illustrated in FIGS. 4a to 4e. This device is similar to the pulsing device shown in FIG. 2 and accordingly is located directly in front of a reactor-core window.

The device comprises a housing 33 in which a disc 34 on a shaft 35 is rotatable. The two ends of shaft 35 are journalled in bearings 36 and 37. The shaft is driven by an electric motor whose housing 38 is fastened to the housing 33 of the entire device. The material for the housing 33 and for the rotating disc 34, aside from meeting mechanical requirements, should be as little activatable as possible and should impose a slightest feasible effect upon the reactivity of the reactor. For modulated fast reactors, the same materials as mentioned above with reference to the pulsating device of FIG. 2 are applicable. For thermal reactors, the use of steel should be avoided as much as possible, because steel may become excessively activated. Relative to the bearings 36 and 37, the foregoing description of FIG. 3a is applicable. However, at relatively low rotating speeds, as may be desirable for some modulating frequencies, gas bearings whose permissible minimum speeds are in the vicinity of 300 r.p.m. are no longer applicable. The ball bearings 36 and 37, if provided with grease lubrication, are removed from time to time as units and then replaced by new units. The rotor 39 of the electric motor (reluctance motor) is shrink-fitted upon the shaft 35, and the stator stack 40 is press-fitted into the motor housing 38. After prolonged periods of operation, the stator stack of the reluctance motor, being insulated for example with polyurethane with embedded glass fiber reinforcement, is exchanged together with the housing.

The maximal speed of the rotating disc 34, designed with uniformly distributed thickness, may amount to no more than 1500 r.p.m. For that reason, the disc can be permitted to rotate in atmospheric air, taking into account the occurring frictional losses. Cooling by air is promoted by the fan action of the rotating disc. For this purpose, the housings 33 and 38 are provided with openings at localities 41 and 42, of which the former are remote from the shaft 35 and the latter are close to the shaft. The modulating device is provided with four running wheels 43 (FIGS. 4b, 4e) with whose aid it can be run upon rails into operating position directly in front of the reactor window.

As shown in FIGS. 4b, 4c and 4d, the annular zone of the disc which passes by the reactor window is traversed by a multitude of bores 44 which are distributed over the entire peripheral extent and are arranged in triangular patterns pointing toward the axis. Reflector pins 45 are insertable into selected bores so that the annular zone can be occupied in alternating sequence by a plurality, for example eight, reflector regions of almost freely selective geometric shape. During rotation of the disc 34 these reflector regions pass sequentially in front of the reactor window 46. The network of coordinates on which the bores 44 are located is laid out in such a manner that the inserted pins 45 are as close as possible to each other. The center points of the bores constitute intersections of radii with concentric circles about the rotation axis of the disc 34.

To obtain closest possible occupation of the reflecting areas, the bores 44 can be occupied with reflector pins whose respective cross sections increase from the interior of the disc in the outward direction. As shown in FIG. 4c, the reflector pins 45 may be given a hexagonal cross section and consist of two parts 45a and 45b which are screwed together and thereby centered and fastened in the bores 44.

As mentioned, the pins may consist of fuel material but are preferably made of reflector material. In the case of a modulated fast reactor, the reflector-pin material consists, for example, of beryllium molybdenum, nickel or steel. For a modulated thermal reactor, beryllium or graphite, for example, is applicable for the pins.

The reluctance motor for driving the rotating disc 34 can be supplied with voltage from the same device as described above with reference to the pulsing device, in which case the generator for the drive of the constant-speed main disc of the pulsing device is switched out of operation. For indicating the passage of an active reflector range in front of the reactor window, the method described above for the pulsing device can be employed. For example, if a certain number, such as eight, reflector regions are uniformly distributed peripherally over the active annular zone of the disc 34, the same number of eight mirror strips are polished on the periphery of the disc 34. These individual mirrors reflect the light from a light source upon the sensor of the photo-multiplier whenever the appertaining reflector range passes by the window. To permit the light for this optical signal to pass through the housing 33 of the modulating device, a glass pane is inserted into housing 33 at a suitable location.

It will be understood that the present invention is not limited to the particular embodiments described in the foregoing. For example, the drive of the rotating neutron-active bodies may be effected by other means, for example belt or rope drives, turbines, air-pressure drives and others. The carriers for the neutron-active bodies can also be modified with respect to shape and design. In certain cases, the neutron-active bodies may consist of neutron-absorptive substances rather than of nuclear fuel or reflector materials.

Upon a study of this disclosure, such and other modifications will be apparent to those skilled in the art or may result from desiderata or requirements of a particular application; and it will be understood, therefore, that our invention can be given embodiments other than illustrated and described herein without departing from the essential features of our invention and within the scope of the claims annexed hereto.

We claim:

1. The method of modulating a nuclear reactor which comprises repeatedly rotating two structures in mutually overlapping relation outside the fission region of the reactor in front of a neutron window, providing each structure with mutually spaced portions of neutron-active substance in the area of overlap so as to pass by the neutron window during rotation and arranging the portions in a regularly repetitive geometric pattern, whereby the reactor operation is caused to pulsate in accordance with a pulse wave shape and pulse repetition frequency depending upon the rotational speeds and the geometric patterns.

2. A nuclear reactor comprising a reflector-jacketed core containing nuclear fuel elements to form a fission region and having a neutron flux window, two carrier structures rotatably mounted outside said fission region and having respective concentric areas passing by said window on one side thereof during carrier rotation, said carrier structures having each a number of portions of neutron-active material mounted in said area and peripherally spaced from one another so that the portions of neutron-active material of one of said carrier structures are alignable with those respectively of the other of said carrier structures on said one side of said window for pulsating neutronic action upon said fission region when said two carriers are in rotation simultaneously.

3. In a nuclear reactor according to claim 2, said two rotatable carrier structures having a common axis of rotation.

4. A nuclear reactor according to claim 2, comprising respective drives connected with said two carrier structures for rotating them and mounted in the radiation field of said core and window, said drives consisting of substantially radiation-insensitive materials and having wear-subjected parts, said parts being accessibly and removably mounted.

5. A nuclear reactor comprising a reflector-jacketed core containing nuclear fuel elements to form a fission region and having a neutron flux window, two carrier structures rotatably mounted outside said fission region and having respective concentric areas passing by said window during carrier rotation, said carrier structures having respective rotational axes spaced from each other and having each a number of portions of neutron-active material mounted in said concentric area and peripherally spaced from one another for pulsating neutronic action upon said fission region when said two carriers are in rotation simultaneously.

6. In a nuclear reactor according to claim 5, said rotational axes being spaced from each other on diametrically opposite sides of said neutron window.

7. A nuclear reactor comprising a core containing nuclear fuel elements to form a fission region and having a reflector jacket and a neutron flux window through said jacket, a carrier structure with portions of neutron-active substance supported thereon, said carrier structure having bores, and said neutron-active portions being formed of pins and seated in said respective bores, said pins having enlarged heads whose top area is larger than the pin cross section, said carrier structure being movable relative to said core on the outside of said fission region to periodically pass said neutron-active portions by said window for mutual neutronic action between said fission region and said traveling portions, whereby the reactor is modulated in accordance with a pulsating function.

8. A nuclear reactor comprising a reflector-jacketed core containing nuclear fuel elements to form a fission region and having a neutron flux window, two carrier structures rotatably mounted outside said fission region and having respective concentric areas passing by said window during carrier rotation, said carrier structures having each a number of portions of neutron-active material mounted in said area and peripherally spaced from one another for pulsating neutronic action upon said fission region when said two carriers are in rotation simultaneously.

References Cited

UNITED STATES PATENTS

| | | | |
|---|---|---|---|
| 2,790,761 | 4/1957 | Ohlinger | 176—33 |
| 3,031,394 | 4/1962 | McCorkle et al. | 176—42 |
| 3,047,483 | 7/1962 | Polak | 176—21 |
| 3,070,697 | 12/1962 | Muench | 176—21 |

FOREIGN PATENTS

| | | |
|---|---|---|
| 131,782 | 5/1940 | Australia. |
| 132,646 | 5/1940 | Australia. |

OTHER REFERENCES

AEC Document AD-263667, August 1961, pp. 6–8.

Soviet Journal of Atomic Energy, vol. 5, No. 6. December 1958 pp. 1533–1534 by T. N. Zubarev.

CARL D. QUARFORTH, Primary Examiner

H. E. BEHREND, Assistant Examiner

U.S. Cl. X.R.

176—33, 40, 86